United States Patent Office 3,652,504
Patented Mar. 28, 1972

3,652,504
RADIATION SENSITIVE POLYURETHANE
Adnan A. R. Sayigh and Fred A. Stuber, North Haven, and Henri Ulrich, Northford, Conn., assignors to The Upjohn Company, Kalamazoo, Mich.
No Drawing. Filed Mar. 2, 1970, Ser. No. 15,948
Int. Cl. C08q 22/04
U.S. Cl. 260—77.5 A
4 Claims

ABSTRACT OF THE DISCLOSURE

Polyurethane coatings are chemically bonded to substrates including polyolefins and like substrates with which polyurethanes will not normally react, by incorporating, into the polyurethane coating composition used to prepare the coating, from 0.1 percent to 10 percent by weight, based on polyurethane, of a sulfonylazide of formulae:

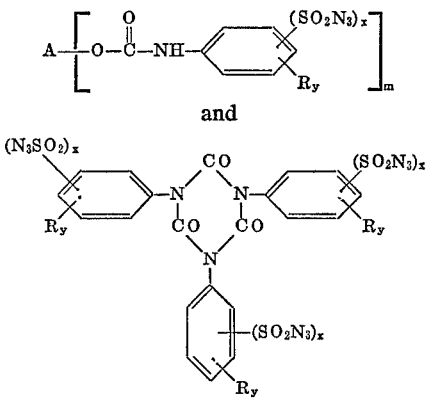

wherein A is the residue of an aliphatic alcohol having $m$ hydroxyl groups and a molecular weight less than 300, R is lower-alkoxy or halo, $x$ is 1 to 2, $y$ is 0 to 2 and $x+y$ is $\not> 3$, the $SO_2N_3$ groups are in 3, 4, or 5-positions in the phenyl rings provided that one such position is always unsubstituted and $m$ is 1 to 6. The chemical bonding can be carried out by irradiation imagewise thereby making the compositions useful in photoresist systems.

BACKGROUND OF THE INVENTION

(1) Field of the invention

This invention relates to novel polyurethane coating compositions and is more particularly directed to polyurethane coating compositions which contain radiation-sensitive crosslinking agents, and wth processes for chemically bonding said coating compositions to substrates.

(2) Background of the invention

The preparation of polyurethane coatings and their application as protective coatings on buildings and other structures subject to exposure to weathering, particularly marine structures, and on floors and like surfaces to render same resistant to abrasion by scuffing and the like is well-known in the art; see, for example, Saunders and Frisch, Polyurethanes, Chemistry and Technology, Part II, pages 453 to 468 and 477 to 485, Interscience Publishers, New York, 1964, and U.S. Pats. 3,380,950; 3,425,973; 3,428,609; 3,432,456; 3,436,361; and 3,458,459.

While the use of such coatings has been highly successful in the main, there have been a number of instances in which the adhesion between the coating and the substrate has weakened and/or failed, particularly after prolonged exposure to weather or abrasive forces. This has proved to be a particular problem where the substrate is a material such as a polyolefin in which there are no free active hydrogen groups with which any residual isocyanate groups present in the polyurethane coating would react and thereby chemically bond the coating to the substrate.

We have now found that, using certain novel radiation-sensitive crosslinking agents, it is possible to effect chemical bonding between a polyurethane coating and a substrate even when the latter is free from active hydrogen containing groups which would react with free isocyanate groups in said coating. Using the novel process of this invention, it is possible not only to improve the adhesion of polyurethane coatings to substrates which contain active hydrogen atoms but also to effect chemical bonding of polyurethane coating to substrates such as polyolefins and the like, which would not otherwise enter into chemical interaction with the polyurethanes.

SUMMARY OF THE INVENTION

This invention comprises a process for chemically bonding a polyurethane coating to a substrate which process comprises:

(i) applying to said substrate a coating of a composition comprising a volatile inert organic solvent, a non-cellular polyurethane, and from 0.1 percent to 10 percent by weight, based on polyurethane, of a sulfonylazide selected from the class consisting of compounds of the formulae:

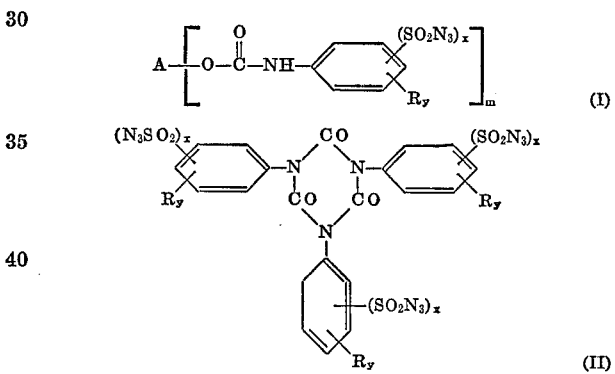

wherein A is the residue of a saturated aliphatic alcohol having $m$ hydroxy groups and a molecular weight less than 300, $m$ is an integer from 1 to 6, R is selected from the class consisting of lower-alkyl and halogen, $x$ is an integer from 1 to 2, $y$ is an integer from 0 to 2 provided that the sum $x+y$ is not greater than 3, and further provided that $m$ is at least 2 when $x$ is 1 in Formula I, the $SO_2N_3$ groups are attached at positions 3, 4, or 5, and R is attached in any otherwise unsubstituted position, provided that at least one of positions 3, 4, and 5 in each benzene ring is unsubstituted; and (ii) exposing said coated substrate to a source of radiation necessary to activate said sulfonylazide and thereby effect chemical bonding of said polyurethane to said substrate.

The invention also comprises the coating compositions comprising a polyurethane in association with a sulfonazide as set forth above.

The term "radiation-sensitive" is used herein to mean that the compounds which it qualifies can be activated and undergo molecular modification on exposure to thermal and/or actinic radiation.

The term "lower-alkyl" means alkyl from 1 to 6 carbon atoms, inclusive, such as methyl, ethyl, propyl, butyl, pentyl, hexyl and isomeric forms thereof.

The term "halogen" is employed in the usually accepted sense as being inclusive of fluorine, chlorine, bromine, and iodine.

The term "residue of a saturated aliphatic alcohol having $m$ hydroxyl groups and a molecular weight less than 300" means the radical obtained by removal of all the hydroxyl groups from an aliphatic alcohol having the stated number of hydroxyl groups and a molecular weight within the stated range. Examples of aliphatic alcohols meeting said specifications are ethanol, propanol, hexanol, ethylene glycol, 1,3 - propylene glycol, hexane-1,2-diol, glycerol, trimethylolethane, trimethylolpropane, hexane-1,2,3-triol, erythritol, pentaerythritol, arabinose, glucose, arabitol and the like.

DETAILED DESCRIPTION OF THE INVENTION

In preparing the polyurethane coatings, and bonding said coatings chemically to substrates in accordance with the invention, one can use any of the polyurethane coating compositions already known in the art; see the summary of references to typical examples of such known coatings set forth under "Description of the Prior Art," supra. The novel feature of the polyuethane coatings of the invention is that there is incorporated into a conventional polyurethane coating composition from about 0.1 percent to about 10 percent of a sulfonylazide having the Formula I or II defined above. The incorporation can be made in any convenient manner. For example, the sulfonazide (I) or (II), in appropriate quantity, can be added directly to the preformed polyurethane coating composition. Alternatively, the sulfonazide (I) or (II) can be dissolved in the volatile inert solvent employed as carrier in the coating composition and the solution of sulfonazide can be blended into the coating composition, or the solution of sulfonazide in solvent can be used as the carrier for the composition and the preformed polyurethane can be dissolved therein.

It is to be noted that an upper limit has been given to the amount of sulfonazide in the coating compositions. If sulfonazide in excess of the above limits is used, the nitrogen which is liberated upon activation by irradiation of the sulfonazide can give rise to problems due to frothing and blowing of the polyurethane coating.

Polyurethane coating compositions, and methods for their preparation, are so well-known in the art that it is unnecessary to give a detailed description thereof herein. Suffice it to say that said compositions are generally prepared by reaction of (a) any of the extensive list of polyisocyanates given in the cited references with (b) an active hydrogen containing component, which can be a single component or a mixture of two or more components inclusive of a wide range of polyols, polyprimary amines, and hydroxyamines such as are specifically exemplified in the above-cited references. The reaction is generally carried out at elevated temperatures, of the order of about 50° C. up to about 250° C., in the presence of any of the catalysts well-known in the art for the catalysis of isocyanates and active hydrogen components.

The reaction can be carried out using a prepolymer technique or using a one-shot procedure. In the latter the components are all brought together and reacted substantially simultaneously. In the former procedure an excess of polyisocyanate is reacted with a part of the total amount of active hydrogen containing material and the isocyanate-terminated prepolymer is then reacted in a subsequent step with the remainder of the active hydrogen material. Whichever method is used the overall ratio of NCO to active hydrogen containing groups employed is within the range of about 1.0:1.0 to about 1.05:1.0.

The polyurethane obtained as described above is then dissolved in a volatile inert solvent to form a coating composition. Alternatively, the reaction between polyisocyanate and active hydrogen containing material can be carried out in the presence of whatever volatile inert organic solvent is to be used as vehicle in the subsequent application of the polyurethane as a coating on a substrate. By "inert organic solvent" is meant an organic solvent which does not react with any of the reactants or interfere in any other way with the desired progress of the reaction. Examples of inert organic solvents are ethyl acetate, butyl acetate, Cellosolve acetate, toluene, xylene, cyclohexanone, acetone, tetrahydrofuran, dioxane and the like. The amount of organic solvent employed is adjusted so that the amount of polyurethane present in the reaction product at the end of the reaction will be in the range of about 5 to about 30 percent by weight.

Accordingly, the coating compositions of the invention comprise a solution, in a volatile inert organic solvent, of a polyurethane and from 0.1 percent to about 10 percent by weight, based on said polyurethane, of a sulfonazide of Formula I or II above. Said coating compositions can also contain conventional pigments, flowing agents, other resins and like adjuvants commonly used in the coating art.

In applying the coating compositions to substrates any of the conventional techniques of application, such as brushing, spraying, rolling, dipping and the like can be employed. The coating so produced can be allowed to dry and cure in air, or, alternatively, the drying and curing step can be combined with the irradiation process required to effect chemical bonding of the polyurethane coating to the substrate in accordance with the invention. This is particularly so when thermal radiation is the means employed to effect said chemical bonding. For example, a convenient method of accomplishing simultaneously both drying and curing of the coating and chemical bonding of the coating to the substrate involves exposing the coated substrate to thermal radiation from suitable sources such as infrared lamps, heated surfaces and the like.

Such processes can be adapted to the production, on a continuous basis, of coated sheet or film material. For example, said film or sheet substrate material is first passed through a zone in which the coating with a polyurethane coating composition of the invention is carried out and the coated sheet or film material is subsequently passed through a zone in which simultaneous drying, curing, and chemical bonding, is achieved by exposure to a source of thermal radiation.

Alternatively, the step of irradiation by a suitable source of thermal or actinic radiation can be accomplished in a separate step after the coating has been allowed to dry and to cure. Indeed, in the case of application of the polurethanes of the invention in the form of coatings to exterior surfaces such as buildings, marine vessels, aircraft and the like, the step of irradiation to effect chemical bonding of the coating to substrate can be allowed to take place using environmental means such as prolonged exposure to sunlight.

A wide variety of sources of actinic radiation can be employed in effecting bonding of the polyurethane coatings of the invention to substrates. Such sources include carbon arcs, mercury vapor lamps, fluorescent lamps, argon glow lamps, photographic flood lamps, and tungsten lamps. Preferably, the source of radiation is one which generates ultraviolet light of wavelength within the range of 250 nm. to about 390 nm.

While the novel coating compositions of the invention can be used to produce chemically bonded coatings on a wide variety of substrates, they are particularly useful in providing chemically bonded coatings on substrates to which such coatings could not be bonded hitherto. For example, the polyurethanes of the invention can be chemically bonded to substrates which contain a plurality of —C—H bonds. Such substrates are inclusive of polyolefins such as polyethylene, polypropylene and the like, natural rubbers, butyl rubbers, SBR rubbers, polyisoprene, polybutadiene, polyacrylonitrile, ethylene-propylene terpolymers, copolymers of butadiene and acrylonitrile, copolymers of butadiene and methyl methacrylate and the like. Such polymeric substrates are widely used in the wrapping and packaging arts, particularly in the case of clear films produced from polyethylene, polypropylene and the like. Such films have proved difficult to coat permanently with surface coatings in the form of printing, decoration and the like. The most common method of accomplishing this hitherto has been by prior treatment of the film, as by exposure to corona discharge and the like, followed by application of conventional dyestuffs, printing ink and like materials.

We have now found that coating of such films can be accomplished simply and rapidly, in a highly economical fashion, to produce a chemically bonded coating on said film using the process described above. If desired, the irradiation step of the process can be carried out imagewise. That is to say, a negative image of the printing or other markings to be reproduced is interposed between the coated film and the source of either thermal or actinic radiation in the irradiation step. In this manner chemical bonding of the coating to the substrate film is effected only in those portions of the coating which have been exposed to the radiation. The unexposed portions of the coating are then dissolved away by use of a suitable solvent, leaving on the surface of the substrate the desired image chemically bonded to said substrate. The chemically bonded image so produced is extremely resistant to abrasion, exposure to solvents, oil, weather and the like, and represents a novel and efficient manner of meeting a problem which has long been current in the film-wrapping art.

In another, related, use of the coating compositions of the invention, the latter are employed as the components of a photoresist system. For example, the said polyurethanes can be used in the photographic reproduction and printing arts to produce printed masters as follows. The polyurethane is applied as a coating, in the manner described above, to an appropriate substrate such as paper, metal and the like film supports normally employed in the reproduction art. A negative of the image to be reproduced, e.g. lined, screened, or half-tone negatives or diapositives, is interposed between the supported film so obtained and a source capable of producing radiation necessary to activate the sulfonazide. The polyurethane in those portions of the supported film exposed to the radiation is thereby bonded to the substrate. The polymer in the unexposed portions of the film can then be removed by washing with polar solvent leaving the exposed polyurethane areas bonded to the substrate in the form of a positive image corresponding to the negative used in the irradiation step. Said image has high resistance to solvents, and mechanical stresses and can be used to advantage as a master from which to reproduce copies of the original.

In similar manner, photoresist systems produced from the compositions of the invention can be used in other photoresist applications such as in the printing of microcircuitry and related applications which involve production of an image, in the form of chemically bonded polymer, on a metal substrate such as copper, followed by removal, in part or in toto, of the uncoated metal by etching. Essentially the same technique as that described above in the production of printed masters, is employed in the formation of the polyurethane image on the substrates.

The sulfonazides of Formula I which are employed in the preparation of the coating compositions of the invention, are readily prepared by reacting the appropriate alcohol $A(OH)_m$, wherein A and $m$ have the significance defined above, with at least a stoichiometric proportion, and preferably an excess, of the appropriate isocyanatobenzenesulfonyl chloride of the formula:

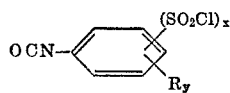

(III)

wherein R, $x$ and $y$ have the significance hereinbefore defined. The reaction is carried out under conditions well-recognized in the art for the condensation of hydroxyl and isocyanato groups. Advantageously, the reactants are brought together at ambient temperatures, i.e. of the order of 20° C. to 25° C., in the presence of an inert organic solvent, as hereinbefore defined. The reaction mixture is preferably maintained below about 50° C., after the reactants have been brought together, in order to avoid reaction of the hydroxy groups in the alcohol with the sulfonyl halide moieties in the isocyanatobenzenesulfonyl chloride (III). Such reaction would clearly give rise to undesired by-products.

If desired, the reaction between the alcohol and the sulfonyl halide (III) can be carried out in the presence of any of the catalysts well-recognized in the art as useful in promoting the reaction between NCO and OH groups.

The reaction of the alcohol and the sulfonyl halide (III) gives rise to an intermediate carbamate (IV) as follows:

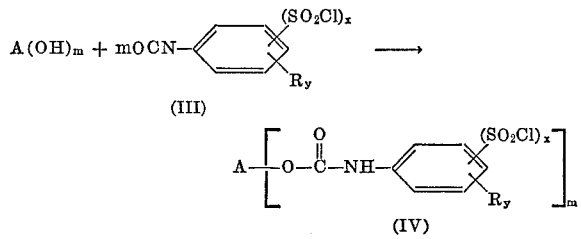

Said carbamate (IV) can, if desired, be isolated from the reaction mixture, for example by evaporation of solvent, and purified, for example by recrystallization, before conversion to the desired sulfonazide (I). However, it is generally not necessary to isolate the compound (IV) prior to its conversion to the desired sulfonazide (I). Indeed, in most instances, the reaction product obtained in the reaction of the alcohol and the sulfonylchloride (III) can be employed without any further treatment in the conversion to the sulfonazide (I). Illustratively, the reaction product obtained in the above process, comprising the carbamate (IV) in solution in inert organic solvent, is treated, without any purification, with the appropriate amount of sodium azide, i.e. 1 molar proportion of sodium azide for each sulfonylchloride group in the carbamate (IV). The reaction with sodium azide is exothermic and is controlled, by cooling as required, to maintain the reaction temperature in the range of about 25° C. to about 80° C. Sodium chloride is eliminated in the reaction and precipitated from the reaction mixture thereby serving as a ready guide to the progress of the reaction.

The desired sulfonazide (I) can be separated from the reaction mixture by conventional procedures. For example, the sodium chloride which has precipitated, is separated by filtration and the filtrate is evaporated to dryness. The sulfonazide (I) so isolated can be purified, if desired, by recrystallization, chromatography or like procedures, prior to being employed in the preparation of the novel coating compositions of the invention.

The isocyanatobenzenesulfonyl chlorides (III) which are employed as starting materials in the above synthesis are, for the most part, known in the art or can be prepared from readily available starting materials, e.g. by phosgenation of the corresponding sulfanilic acids using, for example, the procedure described by Alberino et al., J. Polymer Science, vol. 5, pages 3212–13, 1967.

The sulfonazides of Formula II are prepared by reacting the isocyanatobenzenesulfonyl chloride (III), directly with a substantially stoichiometric amount of sodium azide. The reactants are brought together, slowly, preferably in the presence of a polar solvent such as acetonitrile, dimethylformamide and the like, to control the exothermic reaction. Cessation of deposition of sodium chloride indicates completion of reaction. The desired sulfonazide (II) is isolated from the reaction mixture by filtering off the precipitated sodium chloride and evaporating the filtrate to dryness. Purification of the residue can be achieved by recrystallization or like procedures.

The following preparations and examples describe the manner and process of making and using the invention and set forth the best mode contemplated by the inventors of carrying out the invention but are not to be construed as limiting.

PREPARATION 1

To 1.95 gms. (0.03 mole) of sodium azide in 50 ml. of acetonitrile is added 6.5 gms. (0.03 mole) 4-isocyantobenzenesulfonyl chloride [prepared by a method described by Alberino et al. supra] in 30 ml. of acetonitrile. The addition is done dropwise over a period of 12 minutes with constant stirring of the mixture.

The temperature range during the addition is between 16° C. and 25° C. As the reaction progresses, sodium chloride precipitates from the solution, resulting in a cloudy mixture. When the addition of sulfonylchloride is complete, the resulting mixture is filtered to remove the sodium chloride, and the filtrate evaporated, yielding 6.4 gms. (95.5 percent theoretical yield) of tris(p-azidosulfonylphenyl)isocyanurate in the form of white crystals which darken between 160° C. to 170° C. and have a melting point over 300° C. The compound shows the characteristic azide absorption at 2128 cm.$^{-1}$ and a carbonyl absorption at 1695 cm.$^{-1}$ in its infrared spectrum which is in agreement with the assigned structure.

*Analysis.*—Calculated for $C_{21}H_{12}N_{12}O_9S_3$ (percent): C, 37.50; H, 1.79. Found (percent): C, 37.55; H, 1.84.

PREPARATION 2

Using the procedure described in Preparation 1, but replacing the 4-isocyanatobenzenesulfonyl chloride by 3-isocyanatobenzenesulfonyl chloride there is obtained tris-(m-azidosulfonylphenyl)isocyanurate.

Similarly, using the procedure described in Preparation 1, but replacing 4-isocyanatobenzenesulfonyl chloride by 2-chloro-4-isocyanatobenzenesulfonyl chloride, 4-isocyanato-3-methylbenzenesulfonyl chloride, 2,5-dichloro-4-isocyanatobenzenesulfonyl chloride, or 5-isocyanatobenzene-1,3-di(sulfonylchloride), there are obtained:

tris(3-chloro-4-azidosulfonylphenyl)isocyanurate,
tris(2-methyl-4-azidosulfonylphenyl)isocyanurate,
tris(2,5-dichloro-4-azidosulfonylphenyl)isocyanurate, and
tris[3,5-di(azidosulfonyl)phenyl]isocyanurate,
respectively.

The 2-chloro-, 3-methyl-, and 2,5-dichloro-4-isocyanatobenzenesulfonyl chlorides and the 5-isocyanatobenzene-1,3-di(sulfonylchloride) employed in the above process are obtained by phosgenation of the corresponding known aminobenzenesulfonic acids using the procedure of Alberino, supra.

PREPARATION 3

To 3.1 gms. (0.05 mole) of ethylene glycol in 200 ml. of acetonitrile is added a solution of 21.75 gms. (0.1 mole) of p-isocyanatobenzenesulfonyl chloride in 50 ml. acetonitrile. The addition is accomplished over a period of about 5 minutes with stirring and cooling at circa 3° C. to 6° C. The resulting mixture is allowed to stand overnight, and then heated to reflux temperature, at which time 6.5 gms. (0.1 mole) of sodium azide is added. The mixture so obtained is heated to 75° C. and then allowed to cool to 50° C. Sodium chloride precipitate (5.9 gms.) is filtered out. The filtrate is cooled and the solid which separates (5.6 gm.; melting point 168 to 172° C.) is isolated by filtration. Water is added to the cooled filtrate, yielding a further quantity (5.6 gms.) of white crystals which are separated by filtration, washed and dried under vacuum. The total yield so obtained is 11.2 gms. (45.2 percent theory) of crude ethylenebis(4-azidosulfonyl carbanilate) in the form of white crystals having helting point of 135° C. to 140° C. Upon recrystallization from acetonitrile, purified product with a melting point of 165° C. to 168° C. is obtained.

*Analysis.*—Calculated for $C_{16}H_{14}N_8O_8S_2$ (percent): C, 3.65, H, 2.75. Found (percent): C, 38.45, H, 2.82.

Using the above procedure, but replacing ethylene glycol by an equivalent amount of ethanol, propyl alcohol, hexanol, or octanol, and replacing p-isocyanatobenzenesulfonyl chloride by 5-isocyanatobenzene-1,3-di(sulfonyl chloride), there are obtained ethyl, propyl, hexyl, and octyl 3,5-di(azidosulfonyl)carbanilates, respectively.

PREPARATION 4

To 2.76 gms. (0.03 mole) of glycerol in 200 ml. of acetonitrile is added, over a period of 12 minutes, a solution of 19.57 gms. (0.09 mole) of p-isocyanatobenzenesulfonyl chloride in 50 ml. acetonitrile. To the mixture is added 0.05 gms. of triethylene diamine as catalyst. The resulting mixture is heated to reflux temperature (circa 80° C.) for about 3 hours and then 3 gms. of additional p-isocyanatobenzenesulfonyl chloride is added. The mixture is heated under reflux for an additional 3 hours and then cooled to room temperature. To the cooled mixture is added 7.15 gms. (0.11 mole) sodium azide and the resulting mixture is stirred for about 1 hour. The precipitated sodium chloride is separated by filtration. The solvent is evaporated from the filtrate and the residue triturated in concentrated hydrochloric acid. The resultant white crystals are isolated by filtration, washed with water and dried, yielding 21.85 gms. (96.9 percent theory) of 1,2,3-propylene tris(4-azidosulfonylcarbanilate) with melting point of 105 to 110° C.

Using the above procedure but replacing glycerol by an equivalent amount of erythritol, pentaerythritol, trimethylolpropane or mannitol, there are obtained erythritol tetra(4-azidosulfonylcarbanilate), pentaerythritol tetra(4-azidosulfonylcarbanilate), trimethylolpropane tri(4-azidosulfonylcarbanilate), and mannitol hexa(4-azidosulfonylcarbanilate), respectively.

Example 1

A polyurethane made by heating a mixture of 4.95 gms., (0.005 equivalent) of hydroxy-terminated polyethylene adipate (M.W. 1980) and 0.73 gm. (0.0125 equivalent) of hexanediol with 2.19 gm. (0.0175 equivalent) of diphenylmethane 4,4'-diisocyanate at about 75° C. for 5 hours is dissolved in 50 ml. of tetrahydrofuran. To this solution is added 0.2 gm. of tris(p-azidosulfonylphenyl)isocyanurate dissolved in 2 ml. of acetone.

In a similar manner there are prepared polyurethane coating compositions in which the tris(p-azidosulfonylphenyl)-isocyanurate is replaced by an equal weight of ethyl p-azido sulfonylcarbanilate, glycerol tris(p-azidosulfonylcarbanilate),
erythritol tetra(4-azidosulfonylcarbanilate),
pentaerythritol tetra(4-azidosulfonylcarbanilate),
trimethylolpropane tris(4-azidosulfonylcarbanilate),
mannitol hexa(4-azidosulfonylcarbanilate),
tris(3-chloro-4-azidosulfonylphenyl)-isocyanurate,
tris(2-methyl-4-azidosulfonylphenyl)isocyanurate, and
tris(2,5-dichloro-4-azidosulfonylphenyl)isocyanurate.

Example 2

The coating composition of Example 1 was used to coat sheets of polyethylene, polypropylene, nylon 66, polyacetal, Mylar, using a high speed whirler. The coatings were exposed to the actinic radiation of a mercury lamp (Hanovia type SH) for 4 minutes, the exposure plane being at 15 cm. from the mercury arc. The exposed areas of coating were then found to be insoluble in tetrahydrofuran and could not be rubbed off the substrate by hard rubbing with a cloth.

In a like manner, coatings are prepared and chemically bonded to the same substrates using any of the coating compositions described at the end of Example 1.

We claim:
1. A radiation-sensitive polyurethane coating composition which comprises a non-cellular polyurethane, a volatile inert organic solvent, and from 0.1 percent to 10 percent by weight, based on polyurethane, of a radiation-sensitive sulfonazide selected from the class consisting of compounds of the formulae:

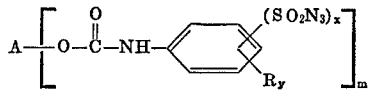

and

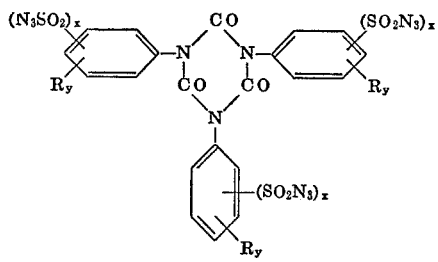

wherein A is the residue of a saturated aliphatic alcohol having $m$ hydroxy groups and a molecular weight less than 300, $m$ is an integer from 1 to 6, R is selected from the class consisting of lower-alkyl and halogen, $x$ is an integer from 1 to 2, $y$ is an integer from 0 to 2 provided that the sum $x+y$ is not greater than 3, and further provided that $m$ is at least 2 when $x$ is 1 in the first formula above, the $SO_2N_3$ groups are attached at positions 3, 4, or 5, and R is attached in any otherwise unsubstituted position, provided that at least one of positions 3, 4, and 5 in each benzene ring is unsubstituted.

2. A composition according to claim 1 wherein the sulfonylazide is ethylenebis(p-azidosulfonylcarbanilate).

3. A composition according to claim 1 wherein the sulfonylazide is glycerol tris(p-azidosulfonylcarbanilate).

4. A composition according to claim 1 wherein said sulfonylazide is N,N′,N″-tris(p-azidosulfonylphenyl)isocyanurate.

References Cited
UNITED STATES PATENTS
3,455,689  7/1969  Laridon et al. _____ 204—159.19

DONALD E. CZAJA, Primary Examiner
M. J. WELSH, Assistant Examiner

U.S. Cl. X.R.
96—68; 117—93.31, 138.8 A, 138.8 E, 138.8 UA, 139; 204—159.14; 260—30.4 N, 31.2 N, 31.4 R, 32.8 N, 33.6 UB